(12) United States Patent
Yu et al.

(10) Patent No.: US 12,095,085 B2
(45) Date of Patent: Sep. 17, 2024

(54) PREPARATION METHOD OF TIN-BASED LITHIUM COBALTATE PRECURSOR AND USE THEREOF

(71) Applicants: YICHANG BRUNP CONTEMPORARY AMPEREX CO., LTD., Hubei (CN); GUANGDONG BRUNP RECYCLING TECHNOLOGY CO., LTD., Guangdong (CN); HUNAN BRUNP RECYCLING TECHNOLOGY CO., LTD., Hunan (CN)

(72) Inventors: Haijun Yu, Guangdong (CN); Yinghao Xie, Guangdong (CN); Aixia Li, Guangdong (CN); Xuemei Zhang, Guangdong (CN); Changdong Li, Guangdong (CN)

(73) Assignees: YICHANG BRUNP CONTEMPORARY AMPEREX CO., LTD., Hubei (CN); GUANGDONG BRUNP RECYCLING TECHNOLOGY CO., LTD., Guangdong (CN); HUNAN BRUNP RECYCLING TECHNOLOGY CO., LTD., Hunan (CN)

(*) Notice: Subject to any disclaimer, the term of this patent is extended or adjusted under 35 U.S.C. 154(b) by 0 days.

(21) Appl. No.: 18/284,770

(22) PCT Filed: Nov. 14, 2022

(86) PCT No.: PCT/CN2022/131589
§ 371 (c)(1),
(2) Date: Sep. 28, 2023

(87) PCT Pub. No.: WO2023/173777
PCT Pub. Date: Sep. 21, 2023

(65) Prior Publication Data
US 2024/0162436 A1 May 16, 2024

(30) Foreign Application Priority Data
Mar. 17, 2022 (CN) .......................... 202210263360.5

(51) Int. Cl.
*H01M 4/525* (2010.01)
*C01G 51/00* (2006.01)
*H01M 4/02* (2006.01)

(52) U.S. Cl.
CPC ............ *H01M 4/525* (2013.01); *C01G 51/42* (2013.01); *C01P 2004/03* (2013.01); *C01P 2006/40* (2013.01); *H01M 2004/028* (2013.01)

(58) Field of Classification Search
CPC ................................ C01G 51/42; H01M 4/525
See application file for complete search history.

(56) References Cited

U.S. PATENT DOCUMENTS

| | | | | |
|---|---|---|---|---|
| 5,618,640 A * | 4/1997 | Idota | ................ | H01M 10/0525 419/1 |
| 2004/0200998 A1 * | 10/2004 | Park | ...................... | C01G 53/42 252/500 |

(Continued)

FOREIGN PATENT DOCUMENTS

| | | |
|---|---|---|
| CN | 107863526 A | 3/2018 |
| CN | 108217753 A | 6/2018 |

(Continued)

OTHER PUBLICATIONS

Machine translation of Yu et al. (CN114634211), publication date Jun. 17, 2022.*

(Continued)

*Primary Examiner* — Jun Li
(74) *Attorney, Agent, or Firm* — MYERS WOLIN, LLC

(57) ABSTRACT

The present disclosure discloses a preparation method of a tin-based lithium cobaltate precursor and use thereof. The method involves adding a cobalt salt solution, a precipitant (Continued)

and a complexing agent for reaction to obtain a precipitate, wherein the precipitant is a mixed solution of carbonate and stannate; calcining the precipitate; and mixing the calcined material with dioxane, ball-milling the mixture, and subjecting the ball-milled product to a heating and pressurization treatment to obtain the tin-based lithium cobaltate precursor. In the present disclosure, after carbonate and stannate are blended, the blend react with cobalt salt to form the co-precipitate of cobalt carbonate and cobalt stannate, and after calcination, a mixture of cobalt(II,III) oxide and tin dioxide is formed. By utilizing dioxane for solvent hot pressing, particles are bonded to each other, forming grain boundary channels. In addition, by doping with tin, the conductivity of the material is improved.

8 Claims, 1 Drawing Sheet

(56) References Cited

U.S. PATENT DOCUMENTS

2012/0326099 A1* 12/2012 Satoh ............... H01M 10/0569
                                                           252/519.1
2019/0140277 A1   5/2019 Dong et al.
2019/0280296 A1   9/2019 Li et al.

FOREIGN PATENT DOCUMENTS

| CN | 110492095 A   | 11/2019 | |
|----|---------------|---------|------------------|
| CN | 111600022 A * | 8/2020  | ........ H01M 10/0525 |
| CN | 112279307 A * | 1/2021  | ............. C01G 51/42 |
| CN | 112794369 A * | 5/2021  | ............. C01G 51/00 |
| CN | 114634211 A   | 6/2022  | |

OTHER PUBLICATIONS

International Search Report with the Written Opinion of the International Searching Authority issued by the China National Intellectual Property Administration for International Patent Application No. PCT/CN2022/131589, dated Feb. 10, 2023, with an English machine translation.

S. P. Keerthana et al., "Influence of tin (Sn) doping on Co3O4 for enhanced photocatalytic dye degradation", Chemosphere, vol. 277, Mar. 19, 2021, pp. 1-8, Elsevier, http://doi.org/10.1016/j.chemosphere.2021.130325.

* cited by examiner

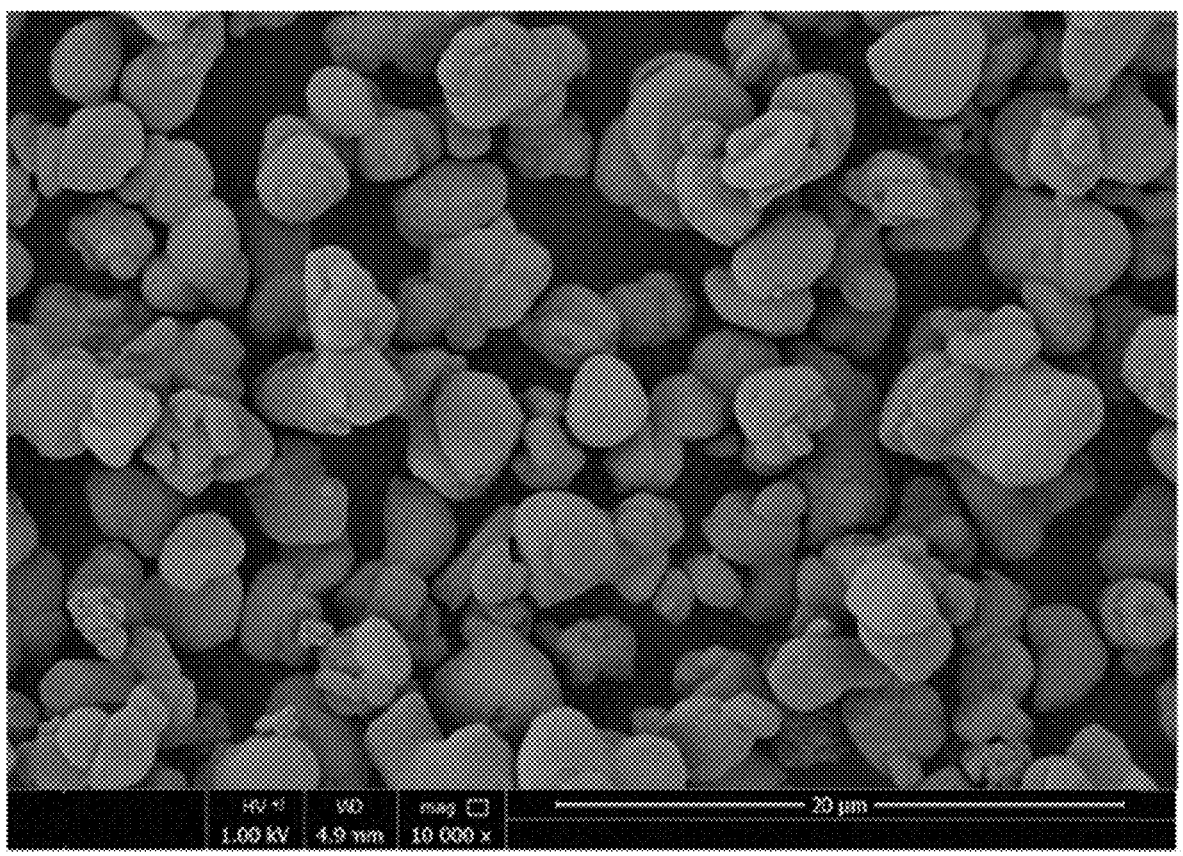

PREPARATION METHOD OF TIN-BASED LITHIUM COBALTATE PRECURSOR AND USE THEREOF

CROSS-REFERENCE TO RELATED APPLICATION

This application is a national stage application under 35 U.S.C. § 371 of international application number PCT/CN2022/131589, filed Nov. 14, 2022, which claims priority to Chinese patent application No. 202210263360.5, filed Mar. 17, 2022. The contents of these applications are incorporated herein by reference in their entirety.

TECHNICAL FIELD

The present disclosure belongs to the technical field of lithium-ion batteries and particularly relates to a preparation method of a tin-based lithium cobaltate precursor and use thereof.

BACKGROUND

Lithium-ion batteries have the advantages of high energy density, long cycle life, high operating voltage, low self-discharge, being environmentally friendly, etc., and are widely applied in portable electronic products and new energy vehicles. Among currently common lithium-ion positive electrode materials, lithium cobaltate is widely used in portable electronic products due to its advantages of simple production process, high gram capacity, stable cycle performance, high compaction density, etc. The theoretical capacity of lithium cobaltate is 274 mAh/g; however, the actual capacity is only about 140 mAh/g. This is because the set charge-discharge potential is 2.5-4.2 V, and only nearly half of lithium ions can be released within this voltage range. Theoretically, increasing the charge cut-off voltage of lithium cobaltate will allow more lithium ions to be de-intercalated, thereby obtaining a relatively large capacity. However, due to the deep de-intercalation of lithium ions from lithium cobaltate at a high voltage, the internal structure of the material collapses and irreversible phase transition occurs, accompanied by the dissolution of cobalt, resulting in capacity decay and a reduced cycle performance. In order to improve the structural stability of lithium cobaltate during the charge-discharge cycle at the high voltage, a method of doping with other elements is usually used to maintain the structural stability of the material.

However, common doping elements include Al, Mg, Cr, Ni, Mn, etc., and after doping, the structure can be stabilized. However, most dopants are oxides, which have poor electronic and ionic conductivities and a dense structure, resulting in a low conductivity of lithium cobaltate. During the charge-discharge, a high interfacial resistance is formed, and the rate performance is reduced, which affects the electrochemical performance of lithium cobaltate. During the preparation of the positive electrode piece, it is necessary to add a conductive agent to improve the overall conductivity. In addition, doping with a carbon material is also used in some cases to increase the conductivity, however, doping with the carbon material only changes the conductivity of the material and does not serve the purpose of stabilizing the structure of the material.

Therefore, there is an urgent need for a doping method that can not only increase the conductivity of the lithium cobaltate material but also stabilize the structure of the material.

SUMMARY

The present disclosure aims to solve at least one of the above-mentioned technical problems existing in the prior art. To this end, the present disclosure proposes a preparation method of a tin-based lithium cobaltate precursor and use thereof. The method improves the conductivity of the material by doping with the element tin while stabilizing the structure of the material.

According to one aspect of the present disclosure, provided is a preparation method of a tin-based lithium cobaltate precursor, including the following steps:

S1: adding a cobalt salt solution, a precipitant and a complexing agent concurrently for reaction, and after the reaction is completed, performing solid-liquid separation to obtain a precipitate, wherein the precipitant is a mixed solution of carbonate and stannate;

S2: first calcining the precipitate in an inert atmosphere, and then calcining the precipitate in an oxidizing atmosphere to obtain a calcined material; and S3: mixing the calcined material with dioxane, ball-milling the mixture to obtain a ball-milled product, and subjecting the ball-milled product to a heating and pressurization treatment to obtain the tin-based lithium cobaltate precursor.

In some embodiments of the present disclosure, in step S1, the concentration of the cobalt salt solution is 1.0-2.0 mol/L.

In some embodiments of the present disclosure, in step S1, the cobalt salt solution is at least one selected from the group consisting of cobalt sulfate solution, cobalt nitrate solution or cobalt chloride solution.

In some embodiments of the present disclosure, in step S1, in the precipitant, the concentration of carbonate is 1.0-2.0 mol/L and the concentration of stannate is 0.05-0.2 mol/L.

In some embodiments of the present disclosure, in step S1, during the reaction, the added amount of cobalt in the cobalt salt solution is maintained to be 2±0.1 times the added amount of metal ions in the mixed solution.

In some embodiments of the present disclosure, in step S1, the complexing agent is aqueous ammonia, and the aqueous ammonia has a concentration of 6.0-12.0 mol/L.

In some embodiments of the present disclosure, in step S1, the reaction is conducted at a temperature of 70-80° C.

In some embodiments of the present disclosure, in step S1, during the reaction, the concentration of ammonia in the reaction material is controlled to be 5-10 g/L.

In some embodiments of the present disclosure, in step S1, during the reaction, the stirring speed is 200-500 r/min.

In some embodiments of the present disclosure, in step S1, the precipitate has a particle size D50 of 4.0-8.0 μm.

In some embodiments of the present disclosure, step S1 further comprises washing the precipitate with water, and drying the precipitate at a temperature of 100-200° C. for 10-30 h.

In some embodiments of the present disclosure, in step S2, the process of calcining the precipitate in the inert atmosphere involves: introducing an inert gas, raising the temperature from room temperature to 200-300° C. at a ramp rate of 0.5-10° C./min, maintaining the temperature for 4-6 h, then raising the temperature to 600-800° C., and maintaining the temperature for 1-2 h.

In some embodiments of the present disclosure, in step S2, the process of calcining the precipitate in the oxidizing atmosphere involves: introducing an oxidizing gas and maintaining the temperature at 600-800° C. for 4-6 h.

Furthermore, the oxidizing gas is air or oxygen. In order to prevent the cobalt carbonate from being oxidized without decomposition in the early stage, which results in the crystal phase of the obtained cobalt(II,III) oxide being impure, anaerobic calcination is first carried out for decomposition, leading to the formation of only cobalt oxide, and oxidative calcination is then carried out, leading to the formation of cobalt(II,III) oxide.

In some embodiments of the present disclosure, in step S3, the ratio of the mass of calcined material to the volume of dioxane (solid-to-liquid ratio) is (3-5) g:5 mL.

In some embodiments of the present disclosure, in step S3, the heating involves: first heating to 100-110° C., maintaining the temperature constant for 0.5-1 h, then heating to 200-220° C., and maintaining the temperature constant for 3-5 h. Furthermore, the ramp rate for heating is 2-3° C./min.

In some embodiments of the present disclosure, in step S3, the pressurization pressure is 30-90 MPa, preferably 60 MPa.

In some embodiments of the present disclosure, in step S3, the ball milling speed is 180-200 r/min, and the ball milling lasts for 2-4 h.

The present disclosure further provides a tin-based lithium cobaltate, wherein the tin-based lithium cobaltate is obtained by mixing the tin-based lithium cobaltate precursor prepared by the above preparation method with a lithium source and then roasting the mixture in an oxygen-containing atmosphere. Further preferably, the molar ratio of the element cobalt in the tin-based lithium cobaltate precursor to the element lithium in the lithium source is 1:(1.0-1.2), the lithium source is at least one selected from the group consisting of lithium carbonate, lithium hydroxide, lithium nitrate or lithium oxalate, the roasting is conducted at a temperature of 900-1200° C., and the roasting lasts for 6-18 h.

The present disclosure further provides the use of the tin-based lithium cobaltate in a lithium-ion battery positive electrode material or a lithium ion battery.

According to a preferred embodiment of the present disclosure, at least the following beneficial effects are provided:

In the present disclosure, after carbonate and stannate are blended, under the action of the complexing agent, the blend react with cobalt salt to form the co-precipitate of cobalt carbonate and cobalt stannate, in which tin and cobalt are uniformly mixed to form a eutectic. After calcination, cobalt carbonate is decomposed into cobalt(II,III) oxide, while tin remains as is, and cobalt stannate is converted into tin dioxide under heat, forming a mixture of cobalt(II,III) oxide and tin dioxide. The reaction formulas are as follows: $Co^{2+}+CO_3^{2-}=CoCO_3$, $Co^{2+}+SnO_3^{2-}=CoSnO_3$, $CoCO_3=CoO+CO_2$, and $6CoO+O_2=2Co_3O_4$. Finally, by utilizing the characteristic of dioxane dissolving tin dioxide, solvent hot pressing is carried out, part of the tin dioxide in the calcined material is continuously dissolved and crystallized, and the particles are bonded to each other, forming grain boundary channels that facilitate charge migration. In addition, by doping with tin, the conductivity of the material is further improved. When sintering with a lithium source to prepare lithium cobaltate, the obtained lithium cobaltate inherits the morphology characteristics of the previous process, and the obtained lithium cobaltate has a good conductivity and cycle performance.

BRIEF DESCRIPTION OF DRAWINGS

The present disclosure will be further illustrated below in conjunction with the accompanying drawings and examples, wherein:

FIG. 1 is the SEM image of tin-based lithium cobaltate prepared in Example 1 of the present disclosure.

DETAILED DESCRIPTION

The concept of the present disclosure and the technical effects produced thereby will be described clearly and completely below in conjunction with the examples, so as to fully understand the purpose, features and effects of the present disclosure. Obviously, the described examples are only some, rather than all, of the examples of the present disclosure. Based on the examples of the present disclosure, other examples obtained by those skilled in the art without involving any inventive effort all fall within the scope of protection of the present disclosure.

Example 1

In this example, a tin-based lithium cobaltate positive electrode material was prepared, involved the following steps of:

Step 1. preparing a cobalt sulfate solution with a concentration of 1.0 mol/L;

Step 2. preparing a mixed solution of sodium carbonate and sodium stannate as a precipitant, wherein in the mixed solution, the concentration of sodium carbonate is 1.0 mol/L, and the concentration of sodium stannate is 0.05 mol/L;

Step 3. preparing aqueous ammonia with a concentration of 6.0 mol/L as a complexing agent;

Step 4. adding the cobalt sulfate solution prepared in step 1, the mixed solution prepared in step 2, and the aqueous ammonia prepared in step 3 to a reaction kettle concurrently for reaction, wherein the stirring speed of the reaction kettle was controlled to be 200 r/min, the temperature in the kettle was 70° C., the concentration of ammonia was 5 g/L, and the added amount of cobalt in the cobalt salt was maintained to be twice that of the added amount of sodium in the mixed solution;

Step 5. when the D50 of the material in the reaction kettle was detected to reach 4.0 stopping feeding;

Step 6. subjecting the material in the kettle to solid-liquid separation, and then washing the precipitate with pure water, and drying the precipitate at 100° C. for 30 h;

Step 7. placing the dried precipitate in a tube furnace, and heating at a ramp rate of 0.5° C./min by introducing an inert gas for protection, wherein the heating gradient involved: raising the temperature from room temperature to 200° C., maintaining the temperature for 6 h, then raising the temperature to 600° C., and maintaining the temperature for 2 h; and then switching to introduce an oxidizing gas, continuing to maintain the temperature at 600° C. for 6 h, and performing cooling, crushing and sieving to obtain a calcined material;

Step 8. mixing the calcined material with dioxane at a solid-to-liquid ratio of 3 g:5 mL, and then mechanically ball-milling the mixture at a speed of 180 r/min for 2 h;

Step 9. placing the ball-milled product in a heat pressure kettle, sealing the heat pressure kettle, heating the heat pressure kettle to 100° C. at a ramp rate of 2° C./min at a pressure of 60 MPa, maintaining the temperature constant for 1 h, then raising the temperature to 200° C. at the same ramp rate, and maintaining the temperature constant for 5 h to obtain a tin-based lithium cobaltate precursor; and Step 10. mixing the tin-based lithium cobaltate precursor with lithium carbonate at a molar ratio of the element cobalt to the element lithium of 1:1.0, then roasting the mixture in the air atmosphere at a roasting temperature of 900° C. for 18 h, and then subjecting the roasting product to crushing, sieving, and iron removal to obtain the tin-based lithium cobaltate positive electrode material.

FIG. 1 is the SEM image of the tin-based lithium cobaltate prepared in this example, and it could be seen from the FIGURE that adhesion was present between particles.

Example 2

In this example, a tin-based lithium cobaltate positive electrode material was prepared, involved the following steps of:
  Step 1. preparing a cobalt nitrate solution with a concentration of 1.5 mol/L;
  Step 2. preparing a mixed solution of sodium carbonate and sodium stannate as a precipitant, wherein in the mixed solution, the concentration of sodium carbonate is 1.5 mol/L, and the concentration of sodium stannate is 0.1 mol/L;
  Step 3. preparing aqueous ammonia with a concentration of 9.0 mol/L as a complexing agent;
  Step 4. adding the cobalt nitrate solution prepared in step 1, the mixed solution prepared in step 2, and the aqueous ammonia prepared in step 3 to a reaction kettle concurrently for reaction, wherein the stirring speed of the reaction kettle was controlled to be 350 r/min, the temperature in the kettle was 75° C., the concentration of ammonia was 8 g/L, and the added amount of cobalt in the cobalt salt was maintained to be twice that of the added amount of sodium in the mixed solution;
  Step 5. when the D50 of the material in the reaction kettle was detected to reach 6.0 μm, stopping feeding;
  Step 6. subjecting the material in the kettle to solid-liquid separation, and then washing the precipitate with pure water, and drying the precipitate at 150° C. for 20 h;
  Step 7. placing the dried precipitate in a tube furnace, and heating at a ramp rate of 5° C./min by introducing an inert gas for protection, wherein the heating gradient involved: raising the temperature from room temperature to 250° C., maintaining the temperature for 5 h, then raising the temperature to 700° C., and maintaining the temperature for 1.5 h; and then switching to introduce an oxidizing gas, continuing to maintain the temperature at 700° C. for 5 h, and performing cooling, crushing and sieving to obtain a calcined material;
  Step 8. mixing the calcined material with dioxane at a solid-to-liquid ratio of 4 g:5 mL, and then mechanically ball-milling the mixture at a speed of 190 r/min for 3 h;
  Step 9. placing the ball-milled product in a heat pressure kettle, sealing the heat pressure kettle, heating the heat pressure kettle to 105° C. at a ramp rate of 2.5° C./min at a pressure of 60 MPa, maintaining the temperature constant for 1 h, then raising the temperature to 210° C. at the same ramp rate, and maintaining the temperature constant for 4 h to obtain a tin-based lithium cobaltate precursor; and
  Step 10. mixing the tin-based lithium cobaltate precursor with lithium nitrate at a molar ratio of the element cobalt to the element lithium of 1:1.1, then roasting the mixture in the air atmosphere at a roasting temperature of 1100° C. for 12 h, and then subjecting the roasting product to crushing, sieving, and iron removal to obtain the tin-based lithium cobaltate positive electrode material.

Example 3

In this example, a tin-based lithium cobaltate positive electrode material was prepared, involved the following steps of:
  Step 1. preparing a cobalt chloride solution with a concentration of 2.0 mol/L;
  Step 2. preparing a mixed solution of sodium carbonate and sodium stannate as a precipitant, wherein in the mixed solution, the concentration of sodium carbonate is 2.0 mol/L, and the concentration of sodium stannate concentration is 0.2 mol/L;
  Step 3. preparing aqueous ammonia with a concentration of 12.0 mol/L as a complexing agent;
  Step 4. adding the cobalt chloride solution prepared in step 1, the mixed solution prepared in step 2, and the aqueous ammonia prepared in step 3 to a reaction kettle concurrently for reaction, wherein the stirring speed of the reaction kettle was controlled to be 500 r/min, the temperature in the kettle was 80° C., the concentration of ammonia is 10 g/L, and the added amount of cobalt in the cobalt salt was maintained to be twice that of the added amount of sodium in the mixed solution;
  Step 5. when the D50 of the material in the reaction kettle was detected to reach 8.0 stopping feeding;
  Step 6. subjecting the material in the kettle to solid-liquid separation, and then washing the precipitate with pure water, and drying the precipitate at 200° C. for 10 h;
  Step 7. placing the dried precipitate in a tube furnace, and heating at a ramp rate of 10° C./min by introducing an inert gas for protection, wherein the heating gradient involved: raising the temperature from room temperature to 300° C., maintaining the temperature for 4 h, then raising the temperature to 800° C., and maintaining the temperature for 1 h; and then switching to introduce an oxidizing gas, continuing to maintain the temperature at 800° C. for 4 h, and performing cooling, crushing and sieving to obtain a calcined material;
  Step 8. mixing the calcined material with dioxane at a solid-to-liquid ratio of 5 g:5 mL, and then mechanically ball-milling the mixture at a speed of 200 r/min for 2 h;
  Step 9. placing the ball-milled product in a heat pressure kettle, sealing the heat pressure kettle, heating the heat pressure kettle to 110° C. at a ramp rate of 3° C./min at a pressure of 60 MPa, maintaining the temperature constant for 0.5 h, then raising the temperature to 220° C. at the same ramp rate, and maintaining the temperature constant for 3 h to obtain a tin-based lithium cobaltate precursor; and
  Step 10. mixing the tin-based lithium cobaltate precursor with lithium hydroxide at a molar ratio of the element cobalt to the element lithium of 1:1.2, then roasting the mixture in the air atmosphere at a roasting temperature of 1200° C. for 6 h, and then subjecting the roasting product to crushing, sieving, and iron removal to obtain the tin-based lithium cobaltate positive electrode material.

Comparative Example 1

In this comparative example, a lithium cobaltate positive electrode material is prepared. The difference between Comparative Example 1 and Example 1 lay in that, in Comparative Example 1, no sodium stannate was added to the precipitant and no solvent hot pressing was carried out on the calcined material, and the specific steps of Comparative Example 1 involved:

Step 1. preparing a cobalt sulfate solution with a concentration of 1.0 mol/L;

Step 2. preparing a sodium carbonate solution with a concentration of 1.0 mol/L as a precipitant;

Step 3. preparing aqueous ammonia with a concentration of 6.0 mol/L as a complexing agent;

Step 4. adding the cobalt sulfate solution prepared in step 1, the sodium carbonate solution prepared in step 2, and the aqueous ammonia prepared in step 3 to a reaction kettle concurrently for reaction, wherein the stirring speed of the reaction kettle was controlled to be 200 r/min, the temperature in the kettle was 70° C., the concentration of ammonia was 5 g/L, and the added amount of cobalt in the cobalt salt was maintained to be twice that of the added amount of sodium in the mixed solution;

Step 5. when the D50 of the material in the reaction kettle was detected to reach 4.0 stopping feeding;

Step 6. subjecting the material in the kettle to solid-liquid separation, and then washing the precipitate with pure water, and drying the precipitate at 100° C. for 30 h;

Step 7. placing the dried precipitate in a tube furnace, and heating at a ramp rate of 0.5° C./min by introducing an inert gas for protection, wherein the heating gradient involved: raising the temperature from room temperature to 200° C., maintaining the temperature for 6 h, then raising the temperature to 600° C., and maintaining the temperature for 2 h; and then switching to introduce an oxidizing gas, continuing to maintain the temperature at 600° C. for 6 h, and performing cooling, crushing and sieving to obtain a calcined material; and Step 8. mixing the calcined material with lithium carbonate at a molar ratio of the element cobalt to the element lithium of 1:1.0, then roasting the mixture in the air atmosphere at a roasting temperature of 900° C. for 18 h, and then subjecting the roasting product to crushing, sieving, and iron removal to obtain the lithium cobaltate positive electrode material.

Comparative Example 2

In this comparative example, a lithium cobaltate positive electrode material is prepared. The difference between Comparative Example 2 and Example 2 lay in that, in Comparative Example 2, no sodium stannate was added to the precipitant and no solvent hot pressing was carried out on the calcined material, and the specific steps of Comparative Example 2 involved:

Step 1. preparing a cobalt nitrate solution with a concentration of 1.5 mol/L;

Step 2. preparing a sodium carbonate solution with a concentration of 1.5 mol/L as a precipitant;

Step 3. preparing aqueous ammonia with a concentration of 9.0 mol/L as a complexing agent;

Step 4. adding the cobalt nitrate solution prepared in step 1, the sodium carbonate solution prepared in step 2, and the aqueous ammonia prepared in step 3 to a reaction kettle concurrently for reaction, wherein the stirring speed of the reaction kettle was controlled to be 350 r/min, the temperature in the kettle was 75° C., the concentration of ammonia was 8 g/L, and the added amount of cobalt in the cobalt salt was maintained to be twice that of the added amount of sodium in the mixed solution;

Step 5. when the D50 of the material in the reaction kettle was detected to reach 6.0 stopping feeding;

Step 6. subjecting the material in the kettle to solid-liquid separation, and then washing the precipitate with pure water, and drying the precipitate at 150° C. for 20 h;

Step 7. placing the dried precipitate in a tube furnace, and heating at a ramp rate of 5° C./min by introducing an inert gas for protection, wherein the heating gradient involved: raising the temperature from room temperature to 250° C., maintaining the temperature for 5 h, then raising the temperature to 700° C., and maintaining the temperature for 1.5 h; and then switching to introduce an oxidizing gas, continuing to maintain the temperature at 700° C. for 5 h, and performing cooling, crushing and sieving to obtain a calcined material; and Step 8. mixing the calcined material with lithium nitrate at a molar ratio of the element cobalt to the element lithium of 1:1.1, then roasting the mixture in the air atmosphere at a roasting temperature of 1100° C. for 12 h, and then subjecting the roasting product to crushing, sieving, and iron removal to obtain the lithium cobaltate positive electrode material.

Comparative Example 3

In this comparative example, a lithium cobaltate positive electrode material is prepared. The difference between Comparative Example 3 and Example 3 lay in that, in Comparative Example 3, no sodium stannate was added to the precipitant, and no solvent hot pressing was carried out on the calcined material, and the specific steps of Comparative Example 3 involved:

Step 1. preparing a cobalt chloride solution with a concentration of 2.0 mol/L;

Step 2. preparing a sodium carbonate solution with a concentration of 2.0 mol/L as a precipitant;

Step 3. preparing aqueous ammonia with a concentration of 12.0 mol/L as a complexing agent;

Step 4. adding the cobalt chloride solution prepared in step 1, the sodium carbonate solution prepared in step 2, and the aqueous ammonia prepared in step 3 to a reaction kettle concurrently for reaction, wherein the stirring speed of the reaction kettle was controlled to be 500 r/min, the temperature in the kettle was 80° C., the concentration of ammonia was 10 g/L, and the added amount of cobalt in the cobalt salt was maintained to be twice that of the added amount of sodium in the mixed solution;

Step 5. when the D50 of the material in the reaction kettle was detected to reach 8.0 stopping feeding;

Step 6. subjecting the material in the kettle to solid-liquid separation, and then washing the precipitate with pure water, and drying the precipitate at 200° C. for 10 h;

Step 7. placing the dried precipitate in a tube furnace, and heating at a ramp rate of 10° C./min by introducing an inert gas for protection, wherein the heating gradient involved: raising the temperature from room temperature to 300° C., maintaining the temperature for 4 h, then raising the temperature to 800° C., and maintaining the temperature for 1 h; and then switching to introduce an oxidizing gas, continuing to maintain the temperature at 800° C. for 4 h, and performing cooling, crushing and sieving to obtain a calcined material; and Step 8. mixing the calcined material with lithium hydroxide at a molar ratio of the element cobalt to the element lithium of 1:1.2, then roasting the mixture in the air atmosphere at a roasting temperature of 1200° C. for 6 h, and then subjecting the roasting product to crushing, sieving, and iron removal to obtain the lithium cobaltate positive electrode material.

TABLE 1

Conductivity performance test

|  | Conductivity (s/cm) | Volume resistivity ($\Omega \cdot$ cm) |
|---|---|---|
| Example 1 | $8.75*10^{-2}$ | 12.3 |
| Example 2 | $9.13*10^{-2}$ | 11.9 |
| Example 3 | $9.36*10^{-2}$ | 11.6 |
| Comparative Example 1 | $2.76*10^{-3}$ | 361.2 |
| Comparative Example 2 | $2.79*10^{-3}$ | 363.3 |
| Comparative Example 3 | $2.75*10^{-3}$ | 361.5 |

Test Example

The lithium cobaltate materials prepared by the examples and comparative examples were used as active materials, acetylene black was used as a conductive agent, and PVDF was used as a binder. The active material, conductive agent, and binder were weighed at the ratio of 92:4:4, a certain amount of organic solvent NMP was added, and then the mixture was stirred and applied to an aluminum foil to form a positive electrode piece. A metal lithium piece was used as a negative electrode, and a CR2430 button battery was assembled in an argon-filled glove box. An electrical performance test was carried out in CT2001A LAND test system. Test conditions: 3.0-4.48 V, current density 1 C=180 mAh/g, and test temperature: 25±1° C. The test results were shown in Table 2.

TABLE 2

Electrochemical performance test

|  | Discharge capacity at 0.1 C/4.48 V, mAh/g | Capacity retention ratio upon 600 cycles at 0.1 C/4.48 V |
|---|---|---|
| Example 1 | 207.9 | 86% |
| Example 2 | 207.5 | 87% |
| Example 3 | 207.1 | 89% |
| Comparative Example 1 | 208.2 | 72% |
| Comparative Example 2 | 208.6 | 71% |
| Comparative Example 3 | 208.8 | 68% |

It could be seen from Table 1 and Table 2 that, the conductivities of the examples were higher and the capacity retention ratios thereof were also significantly higher. This is because the lithium cobaltate materials of the examples are doped with tin, which plays a role in stabilizing the structure of the material, thereby improving the cycle performance. In addition, the tin-based lithium cobaltate material has grain boundary channels that facilitate charge migration, thereby improving the conductivity of the material.

The examples of the present disclosure have been illustrated in detail above in conjunction with the accompanying drawings; however, the present disclosure is not limited to the above-mentioned examples, and within the scope of knowledge possessed by those of ordinary skill in the art, various changes can also be made without departing from the gist of the present disclosure. Furthermore, without conflict, the examples of the present disclosure and the features in the examples may be combined with each other.

The invention claimed is:

1. A preparation method of a tin doped lithium cobaltate precursor, comprising the following steps:
    S1: adding a cobalt salt solution, a precipitant and a complexing agent concurrently for reaction, and after the reaction is completed, performing solid-liquid separation to obtain a precipitate, wherein the precipitant is a mixed solution of carbonate and stannate, wherein the carbonate is sodium carbonate, and the stannate is sodium stannate;
    S2: first calcining the precipitate in an inert atmosphere, and then calcining the precipitate in an oxidizing atmosphere to obtain a calcined material; and
    S3: mixing the calcined material with dioxane, ball-milling a resulting mixture to obtain a ball-milled product, and subjecting the ball-milled product to a heating and pressurization treatment to obtain the tin doped lithium cobaltate precursor.

2. The preparation method according to claim 1, wherein in step S1, a concentration of the cobalt salt solution is 1.0 mol/L to 2.0 mol/L.

3. The preparation method according to claim 1, wherein in step S1, in the precipitant, a concentration of the carbonate is 1.0 mol/L to 2.0 mol/L and a concentration of the stannate is 0.05 mol/L to 0.2 mol/L.

4. The preparation method according to claim 1, wherein in step S1, the complexing agent is aqueous ammonia, and the aqueous ammonia has a concentration of 6.0 mol/L to 12.0 mol/L.

5. The preparation method according to claim 1, wherein in step S1, the reaction is conducted at a temperature of 70° C. to 80° C.

6. The preparation method according to claim 1, wherein in step S1, the precipitate has a particle size D50 of 4.0 μm to 8.0 μm.

7. The preparation method according to claim 1, wherein in step S3, a ratio of a mass of the calcined material to a volume of dioxane is (3-5) g:5 mL.

8. The preparation method according to claim 1, wherein in step S3, the heating involves first heating to 100° C. to 110° C. and maintaining such heating temperature for a duration of 0.5 h-1 h, and then heating to 200° C. to 220° C. and maintaining such heating temperature for a duration of 3 h-5 h.

* * * * *